United States Patent Office 3,537,901
Patented Nov. 3, 1970

3,537,901
TREATING METHOD FOR BUSHINGS
John C. Purdue, Toledo, Ohio, assignor to B & D Salvage, Inc., Portage, Ohio, a corporation of Ohio
No Drawing. Continuation of application Ser. No. 720,445, Apr. 11, 1968. This application Aug. 18, 1969, Ser. No. 859,497
Int. Cl. C23d 17/00; B08b 3/04
U.S. Cl. 134—42        7 Claims

ABSTRACT OF THE DISCLOSURE

A method for conditioning prior to disassembly of a bushing, which bushing comprises a tubular elastomeric member radially compressed between a rigid metal core and a rigid coaxial metal sleeve. The bushing is immersed in a liquid bath of a plasticizer [1] maintained at a temperature from about 290° F. 525° F. The plasticizer is preferably one having low vapor pressure, high resistance to migration in a polymer, and good stability to heat and light. The bushing is removed from the bath at a point when softening of the interfaces between the elastomeric member and the core and between the elastomeric member and the sleeve has occurred but while the interior of the elastomeric body is still substantially firm. The temperature of the bath is selected according to the identity of the plasticizer and the size of the bushing. Larger bushings require, in general, higher bath temperatures.

---

[1] By definition adopted by the Council of the International Union of Pure and Applied Chemistry in 1951, a plasticizer is "a substance or material incorporated in a material (usually a plastic or an elastomer) to increase its flexibility, workability or distensibility. A plasticizer may reduce the melt viscosity, lower the temperature of a second order transition or lower the elastic modulus of the product." A "second order transition" refers to the change from an amorphous state to a plastic state. The "elastic modulus" of a material refers to the ratio of stress to strain in a material subjected to deformation. Usually, a plasticizer is an organic material in liquid or solid form; occasionally it is another plastic or elastomer.

---

This is a continuation of application Ser. No. 720,445, filed Apr. 11, 1968, now abandoned.

BACKGROUND OF THE INVENTION

Field of the invention

Bushings of the type in question have found many uses. They are produced by injecting a composition which is curable to an elastomeric condition into an annular space between the sleeve and the core, while both are supported by a suitable fixture, and curing the material under pressure to provide the tubular elastomeric member. The elastomeric materials vary significantly in composition, resilience and other properties.

The metal parts of such bushings are frequently relatively expensive, e.g. because they have been machined to relatively close tolerances. Accordingly, when a finished bushing is, for any reason, not usable, for example because of misalignment of the component parts thereof, salvage of the sleeve and core for re-use is frequently advantageous.

Description of the prior art

It has been suggested [1] that such bushings can be heated in a vegetable or mineral oil bath at a temperature from

[1] See, for example, U.S. Pat. 3,237,294.

about 440° F. to about 475° F. until the elastomeric member is softened, and that the softened member can then be separated from the sleeve and the core in a suitable press. It has been found that, while the indicated method can be used to salvage the metal parts of such bushings, careful cleaning of the core and of the sleeve is necessary to remove tightly adhering deposits of the elastomeric material or of decomposition products thereof before they are suitable for re-use.

SUMMARY OF THE INVENTION

The present invention is based upon the discovery that, when such bushings are conditioned prior to disassembly in a heated bath of certain plasticizers at a temperature in the range of 290° F. to 525° F., the rate of deterioration of the elastomeric member at the interfaces between the member and the core and between the member and the sleeve is substantially greater than the rate of deterioration of the body of the elastomeric member. By removal of the bushings from the bath after substantial deterioration has occurred at these interfaces, but prior to appreciable deterioration of the interior of the member, several advantages over the previous method can be obtained. For example, since the body of the elastomeric member is still relatively firm, the bushing can be consistently separated into three parts in one operation. With the previous method it was frequently necessary to tear the elastomeric member from the core after separation of the sleeve. The metal parts, moreover, are cleaner and brighter after separation following conditioning according to the instant invention. Furthermore, conditioning of the bushings is achieved in less time at lower temperatures, resulting in increased productivity. Also, the plasticizers of the invention may have a longer service life before replacement than the oils of the previous method.

OBJECTS

It is, therefore, an object of the invention to provide an improved method for the conditioning prior to disassembly of a bushing having a tubular elastomeric member radially compressed between a rigid, inner, cylindrical metal core and a rigid, coaxial, exterior metal sleeve whereby the bushing may be disassembled into its component parts in one operation.

It is a further object of the invention to provide such a method which involves immersing the bushing in a liquid bath of one of certain plasticizers maintained at a temperature in the range of 290° to 525° F. so that deterioration occurs preferentially at the interfaces between the elastomeric member and the core and between the member and the sleeve relative to the body of the elastomeric member, and removing the bushing from the bath after substantial deterioration at the interfaces, but prior to appreciable deterioration of the interior of the body of the member.

It is still another object of the invention to provide such a method wherein the bath is agitated during heat treatment of the bushing.

Other objects and advantages will be apparent from the description which follows, and which is intended only to illustrate and disclose, but in no way to limit, the invention.

DETAILED DESCRIPTION OF THE INVENTION

The method of the invention comprises immersing the bushing, for example in a wire mesh basket, into a liquid bath of a plasticizer maintained at a temperature in the range of 290° F. to 525° F. The bushing is removed from the bath at a point when the interior of the elastomeric member is still relatively firm and deterioration at the interfaces between the elastomeric member and the core and between the member and the sleeve has progressed sufficiently to allow separation of the metal core and the metal sleeve in one operation.

The disassembly of the bushing is easily accomplished by positioning the conditioned bushing on the plate of an appropriate press and advancing a hydraulic ram against the bushing. The hydraulic ram has a protrusion corresponding to the size and configuration of the metal core and a shoulder corresponding to the size and configuration of the elastomeric member so that the metal core is first contacted and separated from the sleeve and elastomeric member followed immediately by contact of the shoulder with the elastomeric member to effect separation of the elastomeric member from the metal sleeve. In one action, thereby, the bushing after conditioning according to the invention is separated into three parts.

The types of plasticizers which are suitable for use in the method of the invention include the ester and polyester types, including the alkyl esters of dimer acids, e.g., produced as described in U.S. Pat. 3,280,140, column 2, lines 20 et seq., the phosphates, epoxidized esters of unsaturated acids, and chlorinated aromatics.

The ester and polyester types include the monoesters, made by esterifying a monobasic acid and a monohydric alcohol and include such esters as butyl oleate and butyl stearate; the diesters which are made by esterifying a dibasic acid and a monohydric alcohol or a monobasic acid and a dihydric alcohol and include such diesters as the phthalates, adipates, azelates, sebacates, diesters of glycols with pelargonic and caprilic acids and $C_1$ to $C_{20}$ alkyl diesters of dimer acid; triesters, tetraesters and higher esters made by esterifying tribasic acids and tri, tetra and higher hydric alcohols and include such esters as the trimellitates, citrates and the pentaerythritol esters; and the polyesters which are made by esterifying dibasic acids and dihydric alcohols to make high molecular weight polyesters, and by substituting some of the dibasic acid with a monobasic acid or the dihydric alcohol with a monohydric alcohol to make low molecular weight polyesters for a molecular weight range of from about 800 to about 6000.

The phosphate plasticizers are made by reacting phosphorus oxychloride with cresols, cresylic acid, mixtures of phenol, cresols and xylenols or aliphatic alcohols and include phosphates such as tricresyl phosphate and octyl diphenyl phosphate.

The epoxidized plasticizers include the epoxidized unsaturated triglycerides, mainly epoxidized soybean oil, and epoxidized esters of unsaturated fatty acids such as the higher aliphatic alcohol esters of oleic acid or of tall-oil fatty acids.

The chlorinated aromatics include such plasticizers as the chlorinated biphenyls, chlorinated polyphenyls and chlorinated naphthyls.

Plasticizers which are preferred for use in the method of the invention are those which have low vapor pressure and resistance to migration in a polymer. These properties depend to a great extent upon the molecular weight of the plasticizer, that is, the vapor pressure and migration rate are reduced with increased molecular weight. For purposes of this method, the boiling point serves as a partial indication of the desirable properties of a particular plasticizer. In this regard, it has been found that preferred plasticizers have a boiling point of at least 225° C. at 4 mm. Hg.

Of the above described plasticizers, the polyester and the dimer acid ester types are the most preferred because of their high molecular weight, stability to heat and light, low vapor pressure and high resistance to migration.

Plasticizers which are unsuitable for use in the invention include those plasticizers having a high hydrocarbon content, i.e. those derived from petroleum, since these compounds attack the body of the elastomeric member at the same rate as they attack at the interfaces.

A complete list of plasticizers of the types described together with the names of manufacturers may be found by consulting the Modern Plastics Encyclopedia Issue 1967, volume 44, No. 1A, pages 418–440.

Examples of the plasticizers of the above-described types which have been successfully used in the method of the invention are listed below.

Monoesters:
    n-butylstearate
    tetrahydrofurfuryl oleate
Diesters:
    azelaic acid derivatives
    di-2-ethylhexyl azelate
    di-isooctyl azelate
    di-n-hexyl azelate
Benzoic acid derivatives:
    diethylene glycol dibenzoate
    dipropylene glycol dibenzoate
    triethylene glycol dibenzoate
    polyethylene glycol dibenzoate (600)

Dimer acid diesters produced as subsequently described.

Glycol derivatives:
    diethylene glycol dipelargonate
    triethylene glycol dipelargonate
Sebacic acid derivative:
    dibenzyl sebacate
Phthalate derivative:
    diphenyl phthalate
Polyesters:
    That sold by the Argus Co. under the trade name Drapex 7.7
    Those sold by the Harchem Co. under the trade names Harflex 330, Harflex 320
    Those sold by the Monsanto Chemical Co. under the trade names Santicizer 405, Santicizer 411
Epoxy ester:
    An alkyl epoxy stearate of the general formula $C_8H_{17}CH-O-CH(CH_2)_7COOR$ sold by the Argus Co. under the trade name Drapex 3.2.

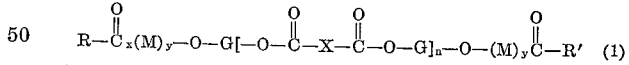

Phosphate derivatives:
    tributoxyethyl phosphate

Preferred polyester type plasticizers for use according to the method of the invention include terminated, unsaturated polyesters of the formula $$R-\overset{O}{\underset{\|}{C}}_x(M)_y-O-G[-O-\overset{O}{\underset{\|}{C}}-X-\overset{O}{\underset{\|}{C}}-O-G]_n-O-(M)_y\overset{O}{\underset{\|}{C}}-R' \quad (1)$$

wherein: $n$ is an integer from 2 to 20; each X is selected from the group consisting of saturated aliphatic hydrocarbons of from 2 to 8 carbon atoms and mono-olefinically unsaturated aliphatic hydrocarbons of from 4 to 5 carbon atoms, the ratio of saturated to unsaturated hydrocarbons represented by X being from 1:3 to 8:1; G is selected from the group consisting of alkylene and oxyalkylene of from 2 to 6 carbon atoms; R and R' are each selected from the group consisting of alkyl and alkenyl of from 5 to 19 carbon atoms, phenyl and naphthyl; M is selected from alkyl of from 4 to 20 carbon atoms, and phenylalkyl and phenoxyalkyl of from 7 to 10 carbon atoms; $x$ and $y$ are unlike integers selected from 0 and 1; and terminated saturated polyesters of the formula $$R-\overset{O}{\underset{\|}{C}}_x(M)_y-O-G[O-\overset{O}{\underset{\|}{C}}-X-\overset{O}{\underset{\|}{C}}-O-G]_n-O-(M)_y\overset{O}{\underset{\|}{C}}-R' \quad (2)$$

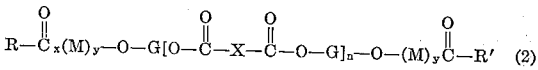

wherein: $n$ is an integer from 2 to 20; X is a saturated aliphatic hydrocarbon of from 4 to 10 carbon atoms; each G is selected from the group consisting of saturated aliphatic dicyclohexyl hydrocarbons of from 13 to 29 carbon atoms and alkylene and oxyalkylene of from 2 to 6 carbon atoms, the ratio of saturated aliphatic dicyclohexyl hydrocarbon to alkylene and oxyalkylene represented by G being from 1:10 to 1:4; R and R' are each selected from the group consisting of alkyl and alkenyl of from 5 to 19 carbon atoms, phenyl and naphthyl; M is selected from alkyl of from 4 to 20 carbon atoms, and phenyl alkyl and phenoxyalkyl of from 7 to 10 carbon atoms; and $x$ and $y$ are unlike integers selected from 0 and 1.

The unsaturated polyesters described by the first formula are essentially the residues of a dihydroxy aliphatic compound of from 2 to 6 carbon atoms, e.g., polyalkylene glycols; a monoolefinic aliphatic dicarboxylic acid e.g. fumaric, maleic, etc., or saturated aliphatic dicarboxylic acids of 4 to 10 carbons, e.g. adipic, succinic, etc., and terminted with groups formed by residues of saturated or unsaturated aliphatic monocarboxylic acids of 6 to 20 carbons, e.g. caproic, decylenic, etc., benzoic and naphthoic acids, saturated aliphatic alcohols of 4 to 20 carbons, e.g. butanol, or phenyl alkanols or phenoxyalkanols of from 7 to 10 carbons. The ratio between the saturated and unsaturated residues is 1:3 to 8:1.

The saturated polyesters described by the second formula are essentially the residues of dihydroxy-dicyclohexylalkanes of from 13 to 29 carbons, e.g. 2,2,2-bis(4-hydroxycyclohexyl)-propane, a dihydroxy aliphatic compound of from 2 to 6 carbon atoms, a saturated aliphatic dicarboxylic acid of from 4 to 10 carbon atoms, and terminated with a group formed from the residues of monocarboxylic saturated and unsaturated aliphatic acids of from 6 to 20 carbon atoms, benzoic acid, naphthoic acid, saturated aliphatic alcohols of from 4 to 20 carbon atoms and phenyl alkyl and phenoxyalkyl alcohols of from 7 to 10 carbon atoms, the ratio of dihydroxy-dicyclohexylalkane to dihydroxy aliphatic compound residues is 1:10 to 1:4.

The best results have been obtained with the polyesters, Santicizer 405, Santicizer 411 and with $C_1$ to $C_{20}$ dialkyl esters of dimer acid. These polyester and dimer acid ester plasticizers are substantially free of odor and smoke at conditioning temperatures which is an advantage when conducting the conditioning in an open vessel.

Any plasticizer of the types described can be used with satisfactory results, but those having flash points less than about 390° F. and boiling points less than about 435° F. must be used in a closed system so that these materials can be heated at controlled pressures to the desired processing temperatures.

The temperature of the plasticizer bath can range from 290° F. to 525° F. and is preferably one in the range of 290° F. to 390° F. The optimum temperature is one at which the rate of deterioration of the elastomeric material at the interfaces between the member and the core and between the member and the sleeve is at a maximum, relative to the rate of deterioration of the interior of the body of the member, so that conditioning time may be reduced to a minimum and deterioration of the body can be minimized. This optimum temperature will depend upon the identity of the plasticizer and the size of the bushing. Selection of the optimum temperature for conditioning a bushing of any given size for a selected plasticizer bath can be determined by simple experimentation. For example, a plasticizer bath can be heated to a temperature in the range of 290° F. to 525° F., and ten bushings of the same size can be immersed, for example in an open mesh wire basket; a bushing can then be removed from the bath every five minutes, and disassembly attempted, preferably while the bushing is still hot. If none of the bushings can be disassembled after about 45 minutes for a large bushing and after about 15 minutes for a small bushing then higher bath temperatures are indicated. The test can then be repeated at from 25° to 50° F. higher than the arbitrarily selected temperature. If the first bushing removed from the bath after 5 minutes shows appreciable deterioration of the body of the elastomeric member, then lower bath temperatures are indicated, and the test should be repeated, at a temperature of about 25° F. lower than the arbitrarily selected temperature. If one of the bushings removed from the bath disassembles readily and cleanly, and if there is no appreciable deterioration of the body of the resilient member, an operable combination of bath temperature and treating time has been determined.

It has been found that treating time, at any given bath temperature, necessary to enable easy and clean disassembly of bushings, can be shortened significantly by agitation of the bath. Agitation can be accomplished by recirculation of the heat transfer fluid, for example by means of a pump through an exterior piping system which, ideally, includes a filter to remove foreign material from the circulated fluid. Agitation can also be accomplished by suitable movement of baskets in which the bushings are supported within the bath, or by a gas or vapor introduced into the bath or formed within the bath.

It should be understood that, at the temperatures preferably used for conditioning bushings according to the invention, prolonged immersion of the bushings would cause substantial deterioration of the body of the elastomeric member. Such deterioration is undesirable, because, so far as is known, clean disassembly is impossible after this has occurred. Extensive subsequent cleaning of each metal core and of each metal sleeve is then necessary before the respective parts are suitable for re-use.

The following example is presented solely for the purpose of further illustrating and disclosing the invention, and is in no way to be construed as a limitation thereon.

EXAMPLE

An open-topped tank having a total capacity of about 65 gallons was charged with approximately 45 gallons of a dioctyl dimerate produced as described below. The polyester had a viscosity of 12.96 centistokes or 70.1 Saybolt Universal seconds at 210° F., an acid number of 2.4 (mg. KOH/gm.), a hydroxyl number of 0.7 (mg. KOH/gm.), a flash point of 580° F., a fire point of 650° F., a refractive index at 25° C. of 1.4685, and a specific gravity (20°/4° C.) of 0.902. The bath was heated to a temperature of about 300° F., and 45 bushings supported in baskets made of screen wire were immersed in the bath. Each bushing weighed approximately 6 ounces, and was made up of a generally cylindrical metal core having an outside diameter of about ¾ inch and a wall thickness of about ⅛ inch, an exterior metal sleeve having an outside diameter of about 1¾ inches and a wall thickness of about $1/16$ inch, and a tubular elastomeric member radially compressed between the core and the sleeve. All three, the core, the sleeve and the tubular elastomeric member were approximately 3 inches in length. The bushings were conditioned by immersion in the heated bath for a total of 10 minutes, during which time the bath was agitated by means of a mechanical stirrer. The bushings were then removed from the bath and disassembled, using a hydraulic press to drive first the core longitudinally out of the tubular elastomeric member, and then to drive the elastomeric member longitudinally from the sleeve in one operation. Disassembly was found to proceed easily and cleanly, and it was found that there was no appreciable deterioration of the interior of the body of the elastomeric member.

The dioctyl dimerate used in the above example, was produced by esterifying a stoichiometric excess of 2 ethyl hexanol with dimer acid produced as described in U.S. Pat. 3,280,140, column 2, lines 20 and following. The esterification was conducted, with stirring, in a closed vessel equipped with a closed vapor exhaust line. Esterification was commenced at a temperature of about 150° C., and the pot temperature was increased, as required, to about 230° C. to maintain a temperature of about 120° C. on the vapor exhaust line to assure removal of water of esterification as formed.

Other dialkyl dimerates, for example dimerates of straight and branched chain alkyl alcohols having from 1 to 20 carbon atoms, can be produced as described in the preceding paragraph, and used as dimerate ester plasticizers for bushing disassembly as described in the example. In general, when the alcohols have fewer than about 8 carbon atoms, a catalyst such as p-toluene sulfonic acid or sulfuric acid is preferably used to produce the dialkyl dimerate plasticizer. Such catalyst can be used, with lower reaction temperatures, to produce other dialkyl dimerate plasticizers. The preferrred dimerates for use in disassembling bushings according to the invention are dimerates of straight and branched chain alkyl alcohols having from 8 to 16 carbon atoms.

The procedure in the above example has also been repeated using the polyester plasticizers commercially available under the trade designations "Santicizer 405" and "Santicizer 411" and with substantially the same results, including substantial freedom from noxious fumes, even when the treatment for disassembly is conducted in an open vessel. The other plasticizers specifically disclosed above have also been used, and with substantially equivalent results insofar as ease of disassembly of the bushings is concerned. However, using the other identified plasticizers, in an open vessel, noxious fumes are evolved, which are undesirable insofar as side effects on attendant personnel are concerned.

It will be apparent to those skilled in the art that various changes and modifications can be made from the specific details set forth above without departing from the spirit and scope of the invention as defined in the appended claims.

What I claim is:

1. A method for conditioning prior to disassembly of a bushing having a tubular elastomeric member radially compressed between a rigid, cylindrical metal core and a rigid, coaxial, metal sleeve, said method comprising
   imersing the bushing in a liquid bath of a plasticizer selected from the group consisting of monoesters, diesters, polyesters, epoxy esters, and phosphate esters, said plasticizer bath being maintained at a temperature sufficiently high to cause preferential deterioration at the interfaces between the elastomeric member and the metal core and metal sleeve,
   removing the bushing from the bath after substantial deterioration has occurred at the interfaces between the elastomeric member and the metal core and between the elastomeric member and the metal sleeve, but before appreciable deterioration of the interior of the elastomeric member has occurred.

2. The method as claimed in claim 1, wherein the plasticizer is one having a flash point greater than 390° F. and a boiling point higher than 435° F.

3. A method as claimed in claim 1, wherein the temperature is one at which the rate of deterioration of the elastomeric material at the interfaces between the member and the core and between the member and the sleeve, relative to the rate of deterioration of the interior of the elastomeric member is at a maximum.

4. The method as claimed in claim 1, wherein said plasticizer bath is maintained at a temperature in the range of about 290° F. to 525° F.

5. The method as claimed in claim 1, wherein the plasticizer is a polyester.

6. The method as claimed in claim 5, wherein the plasticizer polyester is an adipate and the temperature is 290° F. to 390° F.

7. The method as claimed in claim 5, wherein the plasticizer is a dialkyl dimerate wherein each alkyl group has from 1 to 20 carbon atoms, and the temperature is 290° F. to 390° F.

References Cited

UNITED STATES PATENTS

| | | | |
|---|---|---|---|
| 2,077,785 | 4/1937 | Watkins | 134—42 |
| 2,079,489 | 5/1937 | Cole. | |
| 2,223,362 | 12/1940 | Federman | 134—42 |
| 2,346,228 | 4/1944 | Merrill et al. | 134—26 XR |
| 2,406,458 | 8/1946 | Gerndt et al. | 134—42 |
| 2,852,471 | 9/1958 | Atkins et al. | 134—38 XR |
| 3,237,294 | 3/1966 | Brandeberry | 29—427 |

MORRIS O. WOLK, Primary Examiner

J. T. ZATARGA, Assistant Examiner

U.S. Cl. X.R.

29—427; 134—5, 38